March 25, 1952

R. RUEMELIN 2,590,577

WELDING CABINET

Filed May 20, 1949

INVENTOR.
Richard Ruemelin
BY
Morsell & Morsell
ATTORNEYS.

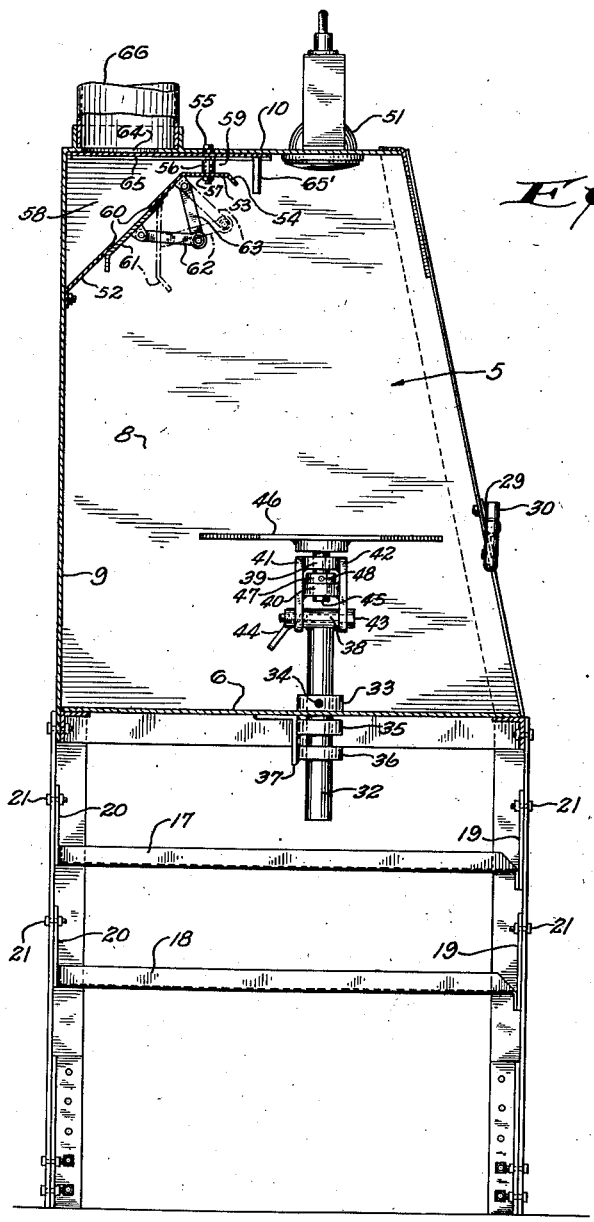

Patented Mar. 25, 1952

2,590,577

UNITED STATES PATENT OFFICE 2,590,577

WELDING CABINET

Richard Ruemelin, Milwaukee, Wis.

Application May 20, 1949, Serial No. 94,269

5 Claims. (Cl. 98—115)

1

This invention relates to improvements in welding cabinets.

The mass production of parts fabricated by welding presents many problems relative, not only to the health and safety of the workmen, but also to the production efficiency of said workmen.

Welding creates poisonous fumes and smoke which are extremely dangerous when inhaled. In addition, welding results in the giving off of rays which are injurious to unprotected human eyes.

In addition to the above, it is important in welding to provide work supporting means which makes it possible to quickly shift the work to any selected position.

With the above in mind, it is a general object of the invention to provide an improved welding cabinet which protects the health of the workman using the same from poisonous fumes, and which, at the same time, protects others in the surrounding area from harmful rays generated during a welding operation.

A further object of the invention is to provide an improved welding cabinet which may be placed alongside of one or more like cabinets to provide a battery thereof.

Another object of the invention is to provide an improved welding cabinet of the class described having the walls thereof lined with electrical insulating material to protect against inadvertent contact of a charged electrode with the cabinet wall, and thereby eliminate the possibility of a hole being burned in said wall.

A further object of the invention is to provide a welding cabinet of the class described having a suction blower for removing poisonous fumes therefrom, and having novel means for controlling the flow of gases which are being removed from the cabinet by said blower.

A further object of the invention is to provide a welding cabinet which is readily adjustable in height to suit the workman and which is equipped with a novel work table, the latter being readily adjustable as to height, position of rotation and angularity, thereby increasing the production efficiency of the workman.

A further object of the invention is to provide a welding cabinet having convenient storage receptacles for spare welding rods and tools, said receptacles being adapted for attachment to the cabinet on either the right or the left hand side thereof to suit the requirements of the workman.

A further object of the invention is to provide a welding cabinet of the class described which is provided with illuminating means in the upper wall thereof positioned to afford proper illumination for the work.

A further object of the invention is to provide a welding cabinet of the class described having a convenient hanger for a welding torch or welding electrode holder, said hanger being attachable on either the right or left hand side of the cabinet to suit the convenience of the workman.

With the above and other objects in view, the invention consists of the improved welding cabinet, and all of its parts and combinations, as set forth in the claims, and all equivalents thereof.

In the drawings accompanying and forming a part of this specification, wherein is shown one complete embodiment of the preferred form of the invention, and wherein the same reference characters indicate the same parts in all of the views:

Fig. 2 is a fragmentary vertical sectional view showing the work table rotated about 90° from its position in Fig. 1 and extending in a horizontal plane.

Figure 1:
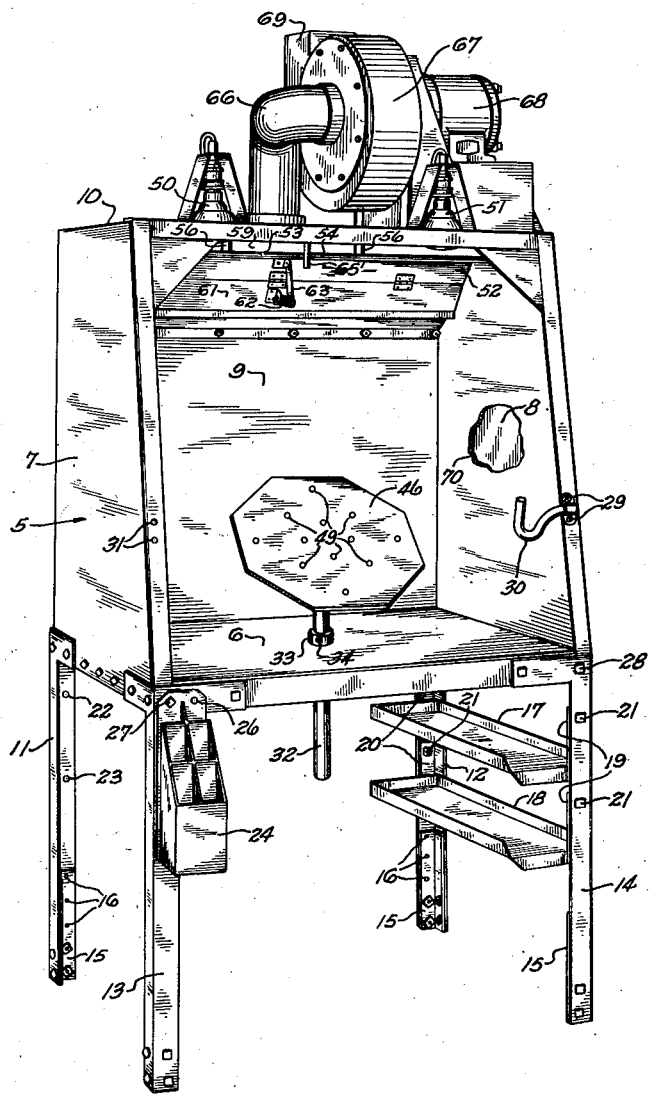
Fig. 1 is a front perspective view of the improved welding cabinet.

Referring more particularly to Fig. 1 of the drawing, the numeral 5 designates the improved welding cabinet which is preferably fabricated from sheet metal over a suitable rigid metal framework. The cabinet 5 has a bottom wall 6, two oppositely disposed, parallel side walls 7 and 8, a rear wall 9, and a top wall 10. The side walls 7 and 8 are shaped with their front edges angled upwardly and rearwardly, as shown clearly in Fig. 2, and the front of said cabinet is open, as shown, to afford access to the interior.

Depending from the lower corners of the cabinet 5 are supporting legs 11, 12, 13 and 14 which are of equal length. Each of said legs has an extension section 15 bolted thereto, and each extension is formed with a plurality of apertures 16. The extension sections 15 are shown in inoperative position in the drawings, but by bolting said members to the legs through suitably selected apertures 16, the members 15 serve to lengthen the legs to which they are connected, and thereby support the cabinet 5 a greater distance above the floor.

A pair of tool shelves 17 and 18 have fixed to each end thereof, as by welding, upwardly projecting arms 19 and 20, the latter being positioned adjacent a common side edge as shown. The arms 19 and 20 are apertured near their upper ends to receive attaching bolts 21 which connect said shelves to the legs 12 and 14, as shown. Since the legs 11, 12, 13 and 14 are preferably made of angle iron, the shelves 17 and 18 are supported in a horizontal plane because the side flanges of the legs 12 and 14 prevent the shelves and their supporting arms from swinging about their supporting bolts 21. The legs 11 and 13 are apertured, as at 22 and 23 (the apertures in the leg 13 being hidden), to permit transfer and attachment of the shelves 17 and 18 to said legs, if desired.

Mounted on the front of the cabinet 5 adjacent the upper end of the leg 13 is a partitioned box 24 for the storage of welding rods. The box 24 has a rear wall which extends upwardly beyond the other walls and which is formed with a pair of apertures 26. A bolt 27 is shown positioned in one of the apertures 26 to secure the box 24 to the cabinet 5. The box 24 can be readily transferred to a position adjacent the upper end of the leg 14, where it can be attached to the cabinet 5 by use of the bolt 28 and aperture 26.

Removably fixed to the front edge of the side wall 8, by means of bolts 29, is a hook or hanger 30 which provides a convenient place on which to hang a welding torch or electrode holder when not in use. The front edge of the wall 7 is apertured, as at 31, to permit transfer thereto of the hanger 30 if this location of the hanger is found more convenient for the workman.

The bottom wall 6 of the cabinet 5 is formed with a centrally disposed aperture through which rotatably and axially slidably extends a work table supporting shaft 32. The shaft 32 has an adjustable annular collar 33 secured thereto by means of a set screw 34, said collar supporting the shaft 32 against downward movement by resting on the floor 6 adjacent the margin of said hole as shown. Below the floor 6 the shaft 32 is rotatably and axially slidably positioned in a pair of bearing collars 35 and 36. The bearings 35 and 36 are fixed to and supported by an angle bracket 37 which is fixed, as by welding, to the under side of the floor 6. The bearings 35 and 36 give the shaft 32 stability and maintain said shaft on a fixed vertical axis.

The upper end of the shaft 32 has fixed thereto a horizontally extending sleeve member 38. Positioned above the sleeve member 38 are a pair of spaced, coaxial bearing collars 39 and 40. The collars 39 and 40 are fixed, at diametrically opposite sides, to supporting lugs 41 and 42, which lugs extend downwardly therefrom and are positioned outwardly adjacent each end of the sleeve member 38. The lugs 41 and 42 are apertured to receive a bolt 43, the latter extending through the sleeve 38. The bolt 43 is provided with a handled adjustment nut 44. The coaction of the nut 44 and the bolt 43 selectively squeezes the lower ends of the lugs 41 and 42 into tight frictional engagement with the ends of the sleeve 38 to maintain the lugs and the collars 39 and 40 in a selected position.

Positioned rotatably in the collars 39 and 40 is a short shaft 45 which projects downwardly from and which is fixed to a work table 46. A collar 47 is fixed to the shaft 45 by means of a set screw 48, said collar being positioned between the bearing collars 39 and 40. The work table 46 may be formed with suitable apertures 49 adapted to receive suitable securing clamps (not shown) for positioning the work on said table during a welding operation.

Mounted in the top wall 10 of the cabinet 5 in the same vertical plane as the shaft 32 and positioned to direct their light on the work table 46, are a pair of spaced electric lights 50 and 51. The lights may be connected to any suitable source of electric current.

An oblique plate 52 has its lower edge connected to the rear wall 9 at a point spaced a substantial distance below the top wall 10. The plate extends forwardly and upwardly, as is clear from Fig. 2. The plate 52 has its upper edge portion formed with a horizontally disposed extent 53 having a forwardly and downwardly angled forward edge 54. A pair of spaced bolts 55 extend downwardly through the top wall 10 and through the portion 53 of the plate 52. A spacer sleeve 56 and a nut 57 cooperate with each bolt 55 to support the forward edge of the plate 52 in a position spaced below the top wall 10, as shown. It is apparent that the plate 52 forms, with the rear wall 9 and top wall 10, a chamber 58 which is triangular in cross-section, and which communicates with the interior of the cabinet 5 through a passageway 59.

The plate 52 is formed with an elongated aperture 60 extending substantially the full width thereof, and hinged to the lower face of the plate 52 is a cover or valve 61 for said aperture. Suitable spring loaded friction links 62 and 63 are pivotally connected to the plate 52 and to the cover 61 and are adapted to hold said cover in any selected position. The dot and dash lines of Fig. 2 show an open position of said cover and links.

Formed in the top wall 10, centrally thereof and adjacent the rear wall 9, is a vent opening 64. A slide damper 65 is mounted on the underside of the top wall 10 for horizontal movement into and out of covering position relative to the vent 64. A downwardly projecting handle 65' fixed to the damper 65 provides a convenient means for moving said damper to any selected position.

Mounted on top of the cabinet 5, and having an inlet connection 66 in communication with the vent opening 64, is an exhaust blower 67 which may be driven by an electric motor 68. The blower 67 has an exhaust connection 69 which may lead to the outside of the building.

When the damper 65 is withdrawn wholly or partially from the vent 64, the blower 67 effectively sucks the smoke and poisonous fumes from a welding operation out of the cabinet 5. If the valve or cover 61 is in the closed solid line position of Fig. 2, then the smoke and fumes can only flow out through the passageway 59. Usually, however, the cover 61 is also opened a desired amount to permit the gases and fumes to flow from the cabinet through the aperture 60 as well as through the passageway 59.

The walls 7 and 8 are lined with electrical insulation material as indicated at 70 in Fig. 1. This prevents inadvertent striking of an arc which might occur if a charged electrode accidentally comes in contact with a metal wall, and prevents burning of holes in the cabinet walls. If desired, the rear wall 9 and the bottom wall 6 may also be lined with the same insulating material.

During a welding operation, the article to be welded is suitably secured on the table 46. By loosening the nut 44, the table 46 can be tilted to any desired position, and by tightening said nut the table may be fixed in the selected position. The rotatable mounting for the shaft 32 permits the table 46 to be turned to any desired position; and the adjustable collar 33 serves to hold the table 46 at any selected height convenient for the workman. During a welding operation any of the above mentioned adjustments may be made to give better access to the work and to thereby shorten the fabricating time to a minimum.

The improved cabinet construction permits a number of the improved cabinets to be placed side by side in a shop. When so placed, the cabinets occupy a relatively small amount of floor space, and there is no possibility of poisonous fumes or harmful rays endangering workers using adjacent cabinets. The provision of movable welding rod receptacles, tool shelves and a movable electrode holder or torch hanger, all of which are adapted to be located for maximum convenience and efficiency, further aid in increasing the output of the workmen using the improved cabinet.

Various changes and modifications may be made without departing from the spirit of the invention, and all of such changes are contemplated as may come within the scope of the claims.

What I claim is:

1. A welding cabinet comprising an enclosure in which work is adapted to be positioned having a top wall, rear wall, and having an open front; a baffle having a length substantially equal to the width of said rear wall and having a rear edge portion fixed to said rear wall, said baffle extending forwardly and upwardly to form with said top and rear walls an auxiliary chamber and having a forward portion connected to said top wall, there being an elongated opening formed in said baffle to provide communication between said auxiliary chamber and the remainder of the enclosure; said enclosure having an exhaust vent communicating with the auxiliary chamber; and an exhaust blower having an inlet communicating with said vent.

2. A welding cabinet comprising an enclosure in which work is adapted to be positioned having a top wall, rear wall, and having an open front; a baffle having a length substantially equal to the width of said rear wall and having a rear edge portion fixed to said rear wall, said baffle extending forwardly and upwardly to form with said top and rear walls an auxiliary chamber and having a forward portion connected to said top wall, there being an elongated opening formed in said baffle to provide communication between said auxiliary chamber and the remainder of the enclosure; a hinged cover for said elongated opening mounted for pivotal movement on an axis parallel with said baffle; said enclosure having an exhaust vent communicating with the auxiliary chamber; and an exhaust blower having an inlet communicating with said vent.

3. A welding cabinet comprising an enclosure in which work is adapted to be positioned having a top wall, rear wall, and having an open front; a baffle having a length substantially equal to the width of said rear wall and having a rear edge portion fixed to said rear wall, said baffle extending forwardly and upwardly to form with said top and rear walls an auxiliary chamber and having a forward portion connected to said top wall, there being an elongated opening formed in said baffle to provide communication between said auxiliary chamber and the remainder of the enclosure; a hinged cover for said elongated opening; means for holding said cover in a selected position; said enclosure having an exhaust vent communicating with the auxiliary chamber; and an exhaust blower having an inlet communicating with said vent.

4. A welding cabinet comprising an enclosure in which work is adapted to be positioned having a top wall, bottom wall, rear wall and having an open front; a baffle having a length substantially equal to the width of said rear wall and having a rear edge portion fixed to said rear wall, said baffle extending forwardly and upwardly to form with said top and rear walls an auxiliary chamber, said baffle being spaced from said top wall at its forward edge to provide an elongated communication between said auxiliary chamber and the remainder of the enclosure, and said baffle being formed with an elongated opening therein extending widthwise of said baffle; an adjustably mounted cover for said opening mounted for pivotal movement on an axis parallel with said baffle; said enclosure having an exhaust vent communicating with the auxiliary chamber; and an exhaust blower having an inlet communicating with said vent.

5. A welding cabinet comprising an enclosure having a top wall, rear wall and a pair of oppositely disposed side walls and having an open front, at least one of said side walls being lined with electrical insulating material; a work table within said enclosure, said table being supported for vertical, angular and rotatable adjustment; a baffle having a length substantially equal to the width of said rear wall and having a rear edge portion fixed to said rear wall, said baffle extending forwardly and upwardly to form with said top and rear walls an auxiliary chamber, said baffle being spaced from said top wall at its forward edge to provide an elongated communication between said auxiliary chamber and the remainder of the enclosure, and said baffle being formed with an elongated opening therein extending substantially the full width of said baffle; a hinged cover for said opening, said cover being movable on an axis parallel with said baffle; means for holding said cover in a selected position, said enclosure having an exhaust vent communicating with the auxiliary chamber; a damper for said exhaust vent; and an exhaust blower having an inlet communicating with said vent.

RICHARD RUEMELIN.

REFERENCES CITED

The following references are of record in the file of this patent:

UNITED STATES PATENTS

| Number | Name | Date |
|---|---|---|
| 1,174,851 | Gloekler et al. | Mar. 7, 1916 |
| 1,218,718 | Throop | Mar. 13, 1917 |
| 1,368,426 | Foote | Feb. 15, 1921 |
| 1,934,808 | Liptay | Nov. 14, 1933 |
| 1,972,917 | Buckel | Sept. 11, 1934 |
| 2,210,370 | Herradora | Aug. 6, 1940 |

OTHER REFERENCES

"Heating and Ventilating," May 1948, pages 70–77.